Aug. 1, 1967   R. V. GODFREY   3,333,469
FUEL LEVEL WARNING MEANS
Filed Aug. 19, 1964
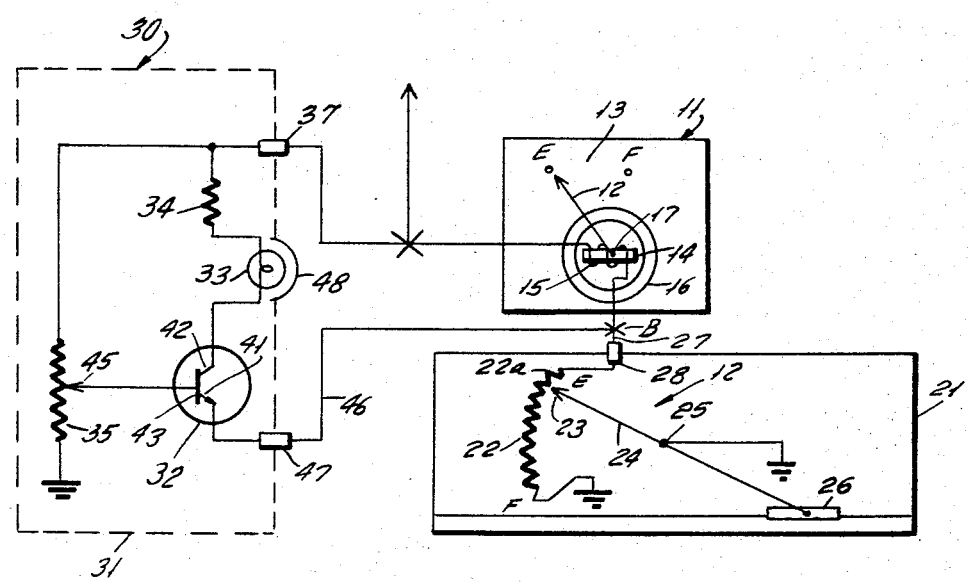
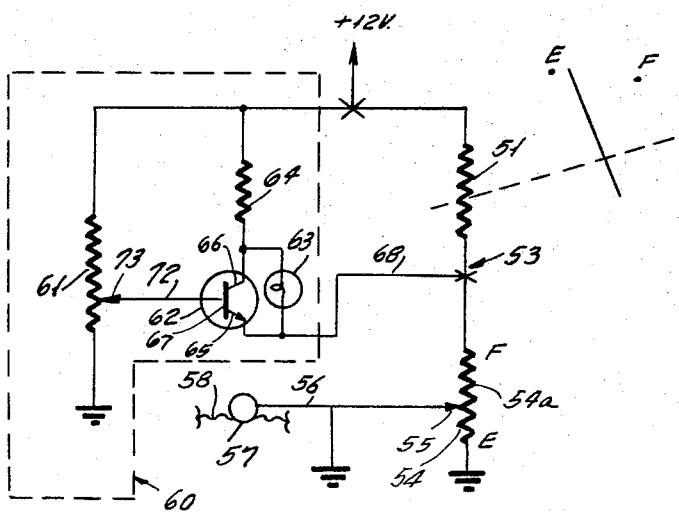
INVENTOR.
ROBERT V. GODFREY
BY
OSTROLENK, FABER, GERB & SOFFEN
ATTORNEYS

United States Patent Office 3,333,469
Patented Aug. 1, 1967

3,333,469
FUEL LEVEL WARNING MEANS
Robert V. Godfrey, Otsego, Mich., assignor to Kal-Equip Company, Inc., Otsego, Mich., a corporation of Michigan
Filed Aug. 19, 1964, Ser. No. 390,517
9 Claims. (Cl. 73—308)

This invention relates to automotive instruments in general and more particularly relates to a novel means which signals a warning that the liquid in the fuel tank has fallen below a predetermined level.

In automobiles and the like the driver may readily ascertain the amount of fuel remaining in the fuel tank by means of a meter mounted in the dashboard. However, the meter is so designed that it blends with the other instruments on the dashboard and as a result when the fuel supply is almost exhausted, all too frequently this fact goes unnoticed until it is too late to conveniently obtain fuel.

In order to overcome this difficulty the instant invention provides a fuel level warning device which operates in conjunction with the existing fuel gauge system to produce a conspicuous indication whenever the fuel supply falls below a predetermined level.

For the most part, existing fuel gauge systems are either of the electro-magnetic or thermostatic types. In each case the active element or element which drives the visual indicator is connected in series with a variable resistor constituting a part of the so-called tank unit The value of this resistance is controlled by a float whose position is a function of fuel supply level. Movement of the float resulting from changes in fuel level moves the contact arm of the variable resistance thereby changing the amount of energy being fed to the active element of the meter.

The device of the instant invention includes a warning light and control means which maintains the light off until the fuel supply level drops below a predetermined value. With the fuel supply level below this predetermined value the indicator or warning light remains on and provides a continuous and conspicuous indication that the fuel supply should be replenished.

Control means for the warning light is provided by a semi-conductor whose biasing circuit is connected into the energizing circuit for the fuel level indicating meter. For the electro-magnetic type of fuel gauge means the warning light is connected in series with a normally non-conducting semi-conductor while for the thermostatic type fuel gauge means the warning light is connected in parallel with a normally conducting semi-conductor for reasons which will hereinafter become apparent.

Accordingly, a primary object of the instant invention is to provide a novel level warning device.

Another object is to provide a novel fuel level warning device which provides a conspicuous visual indication when the fuel supply falls below a safe level and remains on until the fuel supply is replenished.

A further object is to provide a novel fuel level warning device which may be connected to existing fuel gauge systems.

These as well as further objects of this invention shall become readily apparent after reading the following description of the accompanying drawings in which:

FIGURE 1 is a schematic illustrating a fuel level warning system, constructed in accordance with the instant invention, connected to an electro-magnetic type fuel gauge system.

FIGURE 2 is a schematic illustrating another embodiment of the instant invention in which a fuel level warning system is connected to a thermostatic type fuel gauge system.

Now referring more particularly to FIGURE 1 which illustrates fuel level warning device 30 and an electromagnetic fuel gauge system consisting of dashboard unit 11 and tank unit 12. Dashboard unit 11 includes a visual indicator in the form of needle 12 mounted in front of meter face 13. Needle 12 is secured at one of its ends to member 14 which is mounted for movement at pivot 17. Member 14 carries deflection coil 15 and is disposed within magnetic structure 16. As is well known to the art, although not illustrated, structure 16 includes a permanently magnetized portion and a return spring is provided to bias needle 12 about pivot 17.

Unit 12, mounted within fuel tank 21, includes variable resistor 22 having sliding contact 23 mounted at one end of arm 24. Pivot 25, located at a point intermediate the ends of arm 24, pivotally mounts the latter within tank 21. Float 26 is mounted at the end of arm 24 remote from sliding contact 23. Contact 23 is connected to ground by means of arm 24 and pivotal connection 25. The lower end of resistor 22 is grounded while its upper end is connected to lead 27 which extends through insulator 28 exteriorly of tank 21 and is connected to one end of deflection coil 15. The other end of coil 15 is connected to the positive terminal of a 12 volt D.C. source.

What has been described up to this point is an electromagnetic fuel gauge system of conventional construction. The fuel level warning device 30 constituting the instant invention includes housing 31 wherein semi-conductor 32, warning lamp 33, curent limiting resistor 34 and biasing resistor 35 are disposed.

One end of biasing resistor 35 is grounded while the other end is connected by lead 36, extending through housing insulator 37, to the positive terminal of the 12 volt D.C. source which energizes deflection coil 15. Semi-conductor 32 includes an emitter 41, a collector 42 and a base or control electrode 43. The latter is connected through lead 44 to sliding contact 45 of biasing resistor 35. A series circuit extends from the positive terminal of the 12 volt supply to lead 46 as follows: lead 36, current limiting resistor 34, indicator lamp 33, the collector-emitter circuit of semi-conductor 32 and lead 46 which extends through insulator 47 of housing 31. It is noted that lamp 33 is positioned in alignment with an opening in housing 31 covered by lens 48.

It is seen that the base 43 of semi-conductor 32 is at a positive potential with respect to ground as determined by the setting of contact 45. The setting of contact 45 determines the fuel level at which lamp 33 is illuminated. Once the setting of contact 45 is established it remains fixed.

Since contact 23 and the lower end of resistor 22 are both grounded the portion of resistor 22 lying between ground and contact 23 is effectively shorted. Thus, it is seen that when tank 21 is empty there is a maximum resistance in series with deflection coil 15 and when tank 21 is full there is a minimum resistance in series with deflection coil 15. The resistance of deflection coil 15 and the unshorted portion 22a of resistor 22 constitute a volter divider network.

When resistance 22a is zero (tank 21 is empty) emitter 41 is at ground potential. Since base 43 is slightly positive, under this condition collector or output electrode 42 presents a low impedance to current and as a result warning lamp 33 lights. As the fuel level in tank 21 increases, float 26 rises thereby rotating arm 24 in a counterclockwise direction to increase the value of resistance 22a. This in turn raises emitter 41 above ground potential. Semi-conductor 32 continues to conduct until the voltage at emitter 41 approaches very nearly the value of the voltage at base 43. A such times as base 43 is no longer sufficiently positive with respect to emitter 41, semi-conductor 32 switches to the non-conductive switch thereby extinguishing warning lamp 33. The latter remains off until the fuel level again drops below the critical threshold or point at which base 43 acquires sufficient positive potential with respect to emitter 41 to trigger semi-conductor 32 into the "on" or conducting state.

Semi-conductor 32, once started into conduction switches rapidly from "off" to "on" as a result of an avalanche affect. That is, when semi-conductor 32 is "off" the resistance of lamp 33 is very low. When semi-conductor 32 begins to conduct the resistance of lamp 33 increases thereby lowering the potential at collector 42. As the potential at collector 42 is lowered it approaches the potential at base 41. This causes semi-conductor 32 to conduct more heavily which in turn raises the resistance of lamp 33 and in turn lowers the potential at collector 42 again until the lamp 33 is up to full brilliance.

From the foregoing it is seen that with the proper setting of contact 45, warning lamp 33 will become lighted, say when the fuel level drops to two gallons, and will remain lighted until the fuel level is raised above this value.

The circuit of FIGURE 2 is for a thermostatic type of fuel gauge system. In this type of system the active or heat responsive element 51, which drives indicator needle 52, is connected to ground through lead 53 in series with the unshorted portion 54a of variable resistor 54. Element 51 is a resistor having its end remote from lead 53 connected to the positive terminal of the 12 volt D.C. source while the end of resistor 54 remote from lead 53 is grounded. Sliding contact 55 of resistor 54 is operated by linearly guided arm 56 actuated by float 57. Thus, it is seen that as the fuel level 58 goes down the value of resistance 54a increases.

Fuel level warning system 60 includes biasing resistor 61 extending from ground to the positive terminal of the 12 volt D.C. source and also includes semi-conductor 62, warning lamp 63 and current limiting resistor 64. Lamp 63 is connected in parallel with the emitter collector circuit 65, 66 of semi-conductor 62 with collector 66 being connected through resistor 64 to the positive terminal of the 12 volt source and the emitter 65 being connected by lead 68 to lead 53. Lead 68 connects fuel tank unit resistor 54 to the active element 51 of the fuel gauge system. Lead 72 connects base 67 to sliding contact 73 of resistor 61.

In the embodiment of FIGURE 2, when the fuel tank is full resistance 54a is zero so that emitter 65 is grounded. Base 67 being at a positive potential with respect to emitter 65 results in semi-conductor 62 going into conduction so that the emitter-collector or input-output circuit thereof effectively shorts warning lamp 63 and it does not glow. As the fuel level decreases, the value of resistance 54a increases so that the potential at emitter 65 approaches that at base 67 thereby causing semi-conductor 62 to switch to the non-conductive state. With semi-conductor 62 "off" sufficient potential appears across warning lamp 63 to cause it to be illuminated.

While the embodiments of the instant invention hereinbefore described utilize NPN transistors as semi-conductors 32 and 62, it should now be obvious to those skilled in the art that PNP transistor and silicon controlled rectifiers or so-called trigger diodes may be utilized in place of transistors 32 and 62.

Thus, it is seen that with the device of the instant invention merely by choosing the proper setting for the biasing circuit of the control semi-conductor, the warning lamp can be made to light at any desired fuel level and the lamp will remain lighted until the fuel rises above this desired level.

It is also noted that the fuel warning devices of the instant invention may readily be connected to existing fuel gauge systems. That is, only three electrical connections are required; one connection to the accessory terminal of the ignition switch, a second connection B to the line running between the tank and dashboard units of the fuel gauge system, and a ground connection which is probably conveniently achieved simultaneously with the mechanical mounting of the fuel level warning device. Naturally, the fuel level warning system is to be mounted at a location where lens 48 will be conspicuous when the warning lamp is illuminated.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. In a device of the class described, a reservoir for storing fluid, first means for generating a control signal related to fluid level in said reservoir, second means operable to indicate an on and an off condition, and control means driven by said control signal and connected to second means for operation thereof to its on condition whenever fluid in said reservoir falls below a predetermined level and to its off condition whenever fluid in said reservoir is above said predetermined level, said control means including a semi-conductor having a control electrode, and a first voltage divider including adjustable means in circuit with said control electrode for establishing bias of said semi-conductor thereby establishing the predetermined level at which said second means switches between its said on and off conditions, said first means including a second voltage divider connected in parallel with said first voltage divider, said second voltage divider comprising a variable impedance element and another impedance element connected in electrical series, said control means connected in circuit with said second voltage divider at a point between said impedance elements, a float in said tank connected to said variable impedance element for varying impedance of the latter in accordance with fluid level in said reservoir.

2. A device as set forth in claim 1 in which the semi-conductor also includes input and output electrodes connected in series circuit with said second means.

3. A device as set forth in claim 1 in which the float and the variable impedance element are so connected that the impedance of the latter rises as fluid level rises.

4. A device as set forth in claim 3 in which the impedance elements constitute portions of a gauge system for indicating fluid level in said reservoir, said system also including a meter having an indicating element driven by an active element, said another impedance element constituting said active element.

5. A device as set forth in claim 4 in which the second means is comprised of a warning light which is illuminated and extinct in the on and off conditions, respectively.

6. A device as set forth in claim 1 in which the semi-conductor includes input and output electrodes connected in parallel circuit with said second means.

7. A device as set forth in claim 6 in which the float and the variable impedance element are so connected that the impedance of the latter rises as fluid level drops.

8. A device as set forth in claim 7 in which the impedance elements constitute portions of a gauge system for indicating fluid level in said reservoir, said system also including a meter having an indicating element driven by an active element, said another impedance element constituting said active element, said semi-conductor constituting essentially a shorting device across said second means when the latter is in its off condition and a relatively impedance when said second means is in its on condition.

9. A device as set forth in claim 8 in which the second means is comprised of a warning light which is illuminated and extinct in the on and off conditions, respectively.

References Cited

UNITED STATES PATENTS 2,756,410   7/1956   Tobias _____ 340—181
3,157,870   11/1964   Marino _____ 340—249

DAVID SCHONBERG, *Primary Examiner.*

LOUIS R. PRINCE, *Examiner.*

S. C. SWISHER, *Assistant Examiner.*